United States Patent
Saya et al.

(10) Patent No.: US 7,141,647 B2
(45) Date of Patent: Nov. 28, 2006

(54) IMAGE FILE ARRANGEMENT FOR USE WITH AN IMPROVED IMAGE QUALITY ASSURANCE SYSTEM

(75) Inventors: Shioko Saya, Yokohama (JP); Taro Fukaya, Yokohama (JP); Cao Minh Thai, Kawasaki (JP); Shinetsu Fujieda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/873,237

(22) Filed: Jun. 23, 2004

(65) Prior Publication Data

US 2005/0020701 A1    Jan. 27, 2005

(30) Foreign Application Priority Data

Jun. 23, 2003    (JP) .............................. 2003-178477

(51) Int. Cl.
*C08F 6/00*    (2006.01)
(52) U.S. Cl. ........................ 528/486; 521/40; 521/40.5; 521/48; 521/49; 528/44; 528/480; 528/486
(58) Field of Classification Search ................... 521/40, 521/40.5, 48, 49; 528/44, 480, 486
See application file for complete search history.

(56) References Cited

U.S. PATENT DOCUMENTS 3,105,062 A * 9/1963 Graham et al. ................ 528/44
6,245,822 B1 * 6/2001 Terada et al. .................. 521/49

FOREIGN PATENT DOCUMENTS

| DE | 197 32 378 | 8/1998 |
| EP | 0 633 285 | 1/1995 |
| JP | 5-222152 | 8/1993 |
| JP | 6-184513 | 7/1994 |
| JP | 08-120114 | 5/1996 |
| JP | 3185995 | 5/2001 |
| JP | 3242723 | 10/2001 |
| JP | 2002-12699 | 1/2002 |
| JP | 2003-064218 | 3/2003 |
| JP | 2003-160691 | 6/2003 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

A method of treating waste product containing flexible polyurethane resin includes adding a decomposing agent to the waste product to start a decomposition reaction; and terminating the decomposition reaction at a stage in which a diamine concentration derived from an isocyanate raw material of the flexible polyurethane resin is 2 wt % or lower to obtain a pasty intermediate product.

21 Claims, 2 Drawing Sheets

FIG. 1

(i) INITIAL (ii) DECOMPOSITION OF C-O BOND (iii) DECOMPOSITION OF C-N BOND

IMAGE FILE ARRANGEMENT FOR USE WITH AN IMPROVED IMAGE QUALITY ASSURANCE SYSTEM

CROSS REFERENCE TO RELATED APPLICATIONS

This application is based upon and claims the benefit of priority from the prior Japanese Patent Applications No. P2003-178477, filed on Jun. 23, 2003; the entire contents of which are incorporated herein by reference.

BACKGROUND OF THE INVENTION

1. Field of the Invention

The present invention relates to a method of treating waste product containing flexible polyurethane resin, more specifically to a method of treating waste product processed by a volume reduction process using a chemical decomposition method and a reheating process for reproduction.

2. Description of the Related Art

Flexible polyurethane resin has been widely used as cushion material for vehicle seats, furniture, mattresses etc. However, recycling thereof is difficult because the resin is thermosetting and has a 3-dimensional network structure which cannot be remolded. Thus, used flexible polyurethane resin has been disposed of as landfill or incinerated after shredding without being recycled.

In waste processing of a used automobile, for example, after useful parts and the like are collected by a dismantler, scrapped cars are shredded, and, after removing metals such as iron for recycling, the remaining shredder residues of a vehicle seat are disposed of as landfill. However, the flexible polyurethane resin contained in the shredder residues, especially flexible polyurethane foam is bulky and contains bubbles that have a low density in the volume. Thus, there is a demand for reduction in the volume sort of the shredder residue by some method because the transportation cost is high even if the residue is disposed of as landfill, or if heat and resources are recovered by other methods.

Such a situation is not limited to the vehicle seat residues. Waste processing of cushion material which uses flexible polyurethane resins for sofas, chairs, mattresses etc, are in a similar situation, and thus there is a demand for a volume reduction method which is effective in reducing the transportation costs.

In addition to such a volume reduction, there is a demand for recycling of polyurethane resin in a waste product in order to effectively utilize resources in the future. On the other hand, studies have long been conducted on methods for chemically decomposing and liquefying polyurethane resins. For example, those methods include a method of decomposing a rigid polyurethane foam by an amine compound such as alkanol amine and then separating and recovering a decomposed product to reproduce it as a polyurethane foam, a method of decomposing a polyurethane foam with polyol and aminoethanol as decomposing agents and reproducing it as an adhesive agent, a ketone/aldehyde decomposition method, an isocyanate decomposition method, a thermal decomposition method, a hydrolysis method, a heating-up method in the latter process etc.

However, in the case where applying the aforementioned decomposition methods to the decomposition of the flexible polyurethane resin, the finally obtained decomposed product is separated into two phases, i.e., a solid body in a lower layer and a liquid polyol in an upper layer, irrespective of the kinds of decomposition methods used. The decomposed product thus separated into two phases has a reduced volume compared with a flexible polyurethane resin before decomposition, however, handling thereof is difficult, and carrying-in, carrying-out and transportation are complicated. Consequently, it is impossible to provide a sufficient reduction in transportation costs through a reduction in volume.

SUMMARY OF THE INVENTION

An aspect of the present invention inheres in a method of treating waste product containing flexible polyurethane resin encompassing adding a decomposing agent to the waste product to start a decomposition reaction; and terminating the decomposition reaction at a stage in which a diamine concentration derived from an isocyanate raw material of the flexible polyurethane resin is 2 wt % or lower to obtain a pasty intermediate product.

Another aspect of the present invention inheres in a method of treating waste product containing flexible polyurethane resin encompassing adding a decomposing agent to the waste product to start a decomposition reaction; and terminating the decomposition reaction within a diamine concentration range of 1/300000 to 1/2 of a diamine concentration derived from an isocyanate raw material of the flexible polyurethane resin contained in a decomposed final product obtained when the decomposition reaction progresses to a final stage to obtain a pasty intermediate product.

Still another aspect of the present invention inheres in a method of treating waste product containing flexible polyurethane resin encompassing heating a pasty intermediate product obtained by terminating the decomposition reaction of the waste product to obtain a decomposed final product.

Still another aspect of the present invention inheres in an intermediate product treated by a process encompassing adding a decomposing agent to the waste product to start a decomposition reaction; and terminating the decomposition reaction at a stage in which a diamine concentration derived from an isocyanate raw material of the flexible polyurethane resin is 2 wt % or lower to obtain a pasty intermediate product.

Still another aspect of the present invention inheres in a decomposed final product treated by a process encompassing reheating a pasty intermediate product obtained by terminating a decomposition reaction of the waste product containing flexible polyurethane resin, wherein the decomposition reaction is terminated at a stage in which a diamine concentration derived from an isocyanate raw material of the flexible polyurethane resin is 2 wt % or lower.

DETAILED DESCRIPTION OF THE INVENTION

Various embodiments of the present invention will be described with reference to the accompanying drawings. However, it will be obvious to those skilled in the art that the present invention may be practiced without such specific details.

The inventors have discovered a phenomenon of obtaining a pasty intermediate product midway through the decomposition reaction during investigation of the decomposition reaction of the waste product which contains flexible polyurethane resin. The present invention describes a result of applying the phenomenon as a method for reducing a volume of the waste product which contains the flexible polyurethane resin.

Hereinafter, a method for processing waste product containing flexible polyurethane resin will be described according to an embodiment of the present invention. Incidentally, there is no limitation on the flexible polyurethane resin contained in the waste product to be a process target (article to be processed) according to the embodiment of the present invention. In the present invention, the "flexible polyurethane resin" indicates a general polyurethane resin prepared by using polyol of a hydroxyl value 15 to 300 mgKOH/g as a raw material. For example, polyurethane resins are used as a cushion material for vehicle seats, cushion material for chairs, and for bed mattress. Wastes from these products are shredded or crushed as in the case of automobile shredder residues or the like, and these waste products contain a thermoplastic resin, a thermosetting resin, metal, sand, paper, cloth etc., mixed with the flexible polyurethane resin. Targets of the method of the embodiment of the present invention are such waste products, or waste products remaining after metals or the like are removed from those waste products.

The method of the embodiment of the present invention is mainly classified into a "volume reduction process" and a "reheating process". Hereinafter, each process will be described. Further, a "reproduction process" after the reheating process will be described also.

-Volume Reduction Process-

In the volume reduction process according to the embodiment of the present invention, a flexible polyurethane resin contained in a waste product is decomposed by a chemical method using a decomposing agent. As decomposing agents, for example, chemical compounds including an amino group, a carboxyl group and its derivative, an epoxy group, an isocyanate group etc., are available. A decomposition catalyst may be added in order to accelerate the rate of decomposition in some cases. A detailed explanation of the decomposing agents and the decomposition catalysts will be described later.

Figure 1:
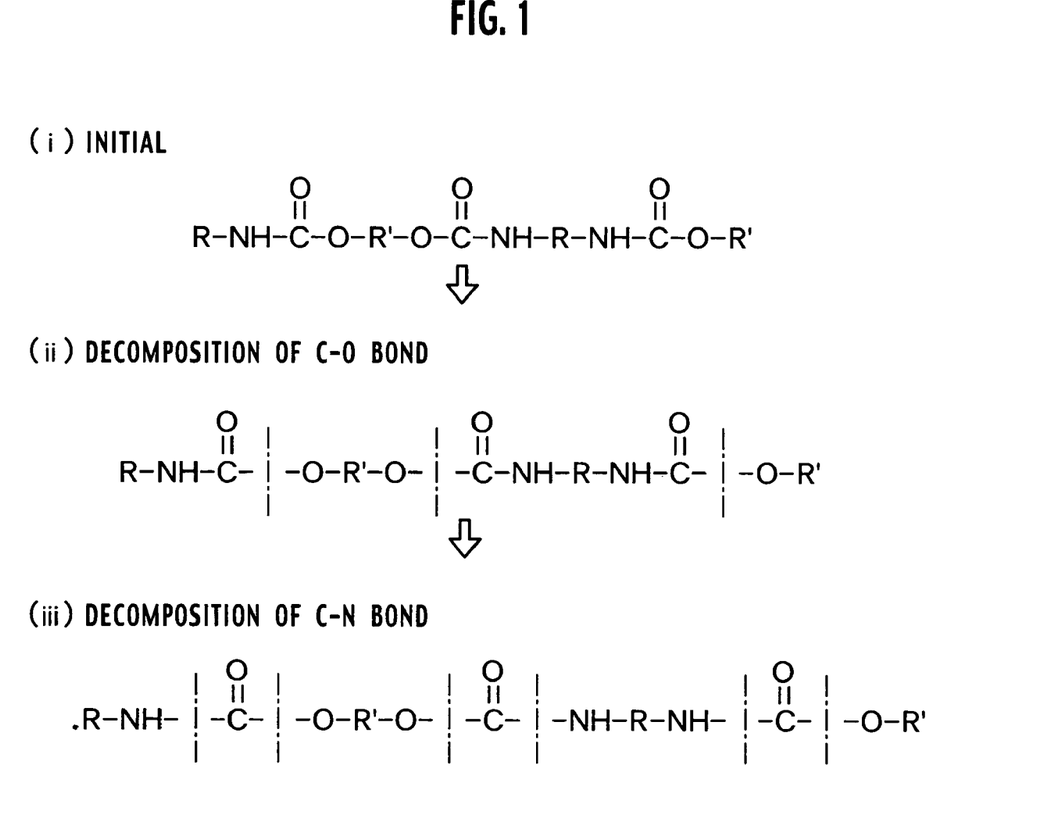
FIG. 1 is a schematic diagram illustrating an example of a decomposition reaction of a flexible polyurethane resin according to the embodiment of the present invention.

The chemical decomposition reaction of the polyurethane resin progresses by a reaction of the decomposing agent. However, a decomposition mechanism thereof is very complex, and has not been completely revealed yet. The inventors presume that the decomposition reaction is divided into at least two stages as shown in FIG. 1. In other words, it is presumed that, at the first decomposition reaction stage, a bond between C and O (C—O) in a urethane bond (—NH—CO—O—) which is a principal chain of the polyurethane resin is cut off, and, at the second decomposition reaction stage, a bond between C and N (C—N) in the urethane bond is cut off. At the second decomposition reaction stage, a decomposed product which includes not only solid but also liquid is generated, and a decomposed final product is obtained which is separated into two phases, i.e., a solid and a liquid. A pasty intermediate product which is an intermediate product of the flexible polyurethane resin is conceivably obtained when the decomposition reaction is terminated at the first decomposition reaction stage. The pasty intermediate product is easy to handle because it is largely reduced in volume compared with the initial flexible polyurethane resin and is not separated into two phases like the decomposed final product.

The volume reduction process according to the embodiment of the present invention is obtained when the decomposition reaction is terminated at the first decomposition reaction stage described above which is midway through the decomposition reaction and a pasty intermediate product can be taken away. Specifically, the decomposition reaction is terminated at a stage in which a diamine concentration derived from an isocyanate raw material of the flexible polyurethane resin is 2 wt % or lower, more suitably 1 wt % or lower. As the diamine derived from an isocyanate raw material of the flexible polyurethane resin, for example, tolylene diamine, 4,4'-methylene diamine, and the like are available. This reaction may be the one in which a diamine concentration is very low like a 10 ppb. In this way, it is possible to obtain a pasty intermediate product. Alternatively, it is possible to obtain a paste which is an intermediate product if the decomposition reaction is terminated at a stage in which a diamine concentration of the intermediate product reaches 1/300000 to 1/2, more preferably 1/100000 to 1/4 of a diamine concentration derived from an isocyanate raw material of the flexible polyurethane resin contained in the decomposed final product.

In the volume reduction process according to the embodiment of the present invention, a batch reaction processing device and a continuous reaction processing device can both be used as long as they are reaction devices capable of kneading a mixture of a waste product containing flexible polyurethane resin to be processed and a decomposing agent while heating at the same time. In order to realize efficient progress of the decomposition reaction, however, use of the continuous reaction processing device is suitable. Additionally, as the continuous reaction processing device, for example, an extruder 1 similar to that shown in FIG. 2 which can execute heating and kneading simultaneously is desirably used.

Figure 2:
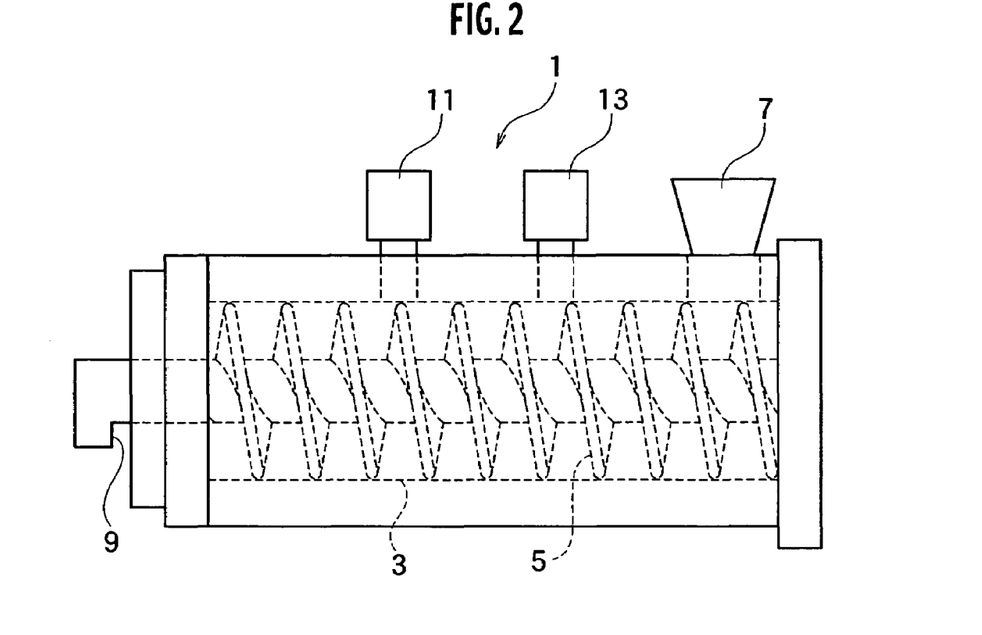
FIG. 2 is a schematic diagram illustrating an example of an extruder which can be used in a volume reduction process described in the embodiment according to the present invention.

The extruder 1 includes a cylinder portion 3 equipped with a temperature controllable heater, and a rotation controllable screw 5 in contact with an inner wall of the cylinder portion 3. An input port 7 is disposed in one end of the cylinder portion 3 to supply a waste product containing flexible polyurethane resin thereinto, and a discharge port 9 is disposed in the other end of the cylinder portion 3. When necessary, a supply port 11 or 13 may be disposed between the input port 7 and the discharge port 9 to supply a decomposing agent or a catalyst into the cylinder portion 3. A heater (not shown) equipped around the cylinder portion 3 can be set to vary the temperature of the cylinder portion 3 from place to place. For example, the heating temperature can be changed before and after the supply port 11.

In the volume reduction process, the temperature of the cylinder portion 3 is set slightly lower than that used in earlier technology for the decomposition reaction of a flexible polyurethane resin. The temperature varies slightly depending on the type of polyurethane resin or the type of decomposing agent. Normally, however, the temperature may be set to a "resin temperature at exit" which can be, e.g., 80° C. to 250° C., more preferably 150° C. to 230° C. Here, "the resin temperature at exit" means the temperature of a processed article discharged through the discharge port 9. Incidentally, if the resin temperature at exit cannot be measured, the resin temperature at exit is substantially equivalent to the highest temperature set in the cylinder portion.

Next, waste product which contains flexible polyurethane resin is put through the input port 7, and a decomposing agent is added through the supply port 13. The waste product to be put in is suitably in a state of being crushed beforehand and subjected to a process of removing metals. The article to be processed and a decomposing agent may be mixed beforehand, and a mixture thereof may be put in through the input port 7. Further, when necessary, another decomposing agent may be added through the supply port 13. When supplying the decomposing agent, liquid decomposing agent may be stored in a decomposing agent tank, and automatically charged by using a liquid injection pump.

The screw 5 in the cylinder portion 3 is rotated to knead the waste product and the decomposing agent which have been put thereinto. Incidentally, "kneading" means mixing with pressure. This kneading operation enables efficient progress of the decomposition reaction. The waste product and the decomposing agent which have been kneaded are moved little by little towards the discharge port 9 following the rotation of the screw while the decomposition progresses by kneading and heating.

In the case where the extruder 1 is used, a retention time of the article to be processed in the device is equivalent to the decomposition reaction time. Thus, if a retention time in the device is set within 15 min., more desirably at about 2 to 10 min., under the aforementioned temperature conditions, the pasty intermediate product can be obtained through the discharge port 9. The retention time in the device can be adjusted by changing the rotational speed of the screw 5 in the cylinder portion 3. If the resin temperature at the exit is higher than 250° C. or the heating time is longer than 15 min., the urethane decomposition reaction excessively progresses to disable acquisition of a pasty intermediate product. Instead, a decomposed product separated into a solid and a liquid is obtained.

Additionally, in the case where the extruder 1 is used, when the intermediate product is discharged through the discharge port 9 to outside, and released from the kneading and rapidly cooled down to room temperature, the decomposition reaction can be terminated instantly. Accordingly, it is possible to easily terminate the urethane decomposition reaction midway through. In this regard, if a batch reaction container or the like is used, it is difficult to surely terminate the decomposition reaction within a predetermined time because of the influence from remaining heat of the container or the like. Apparently, therefore, the extruder 1 is most desirable for the volume reduction process of the embodiment in which the decomposition reaction must be terminated midway through.

FIG. 2 shows an example of an extruder 1 which has a single-screw. However, the extruder 1 is not limited to that of FIG. 2, and any extruders can be used without limitation as long as they can heat and knead simultaneously. For the extruder 1, an twin-screw extruder, a continuous kneader, and a Mono pump and the like may be available. These devices are suitable for processing a large volume of waste products containing flexible polyurethane resin since the decomposition reaction of the polyurethane resins contained in the waste products can be continuously carried out.

Figure 3:
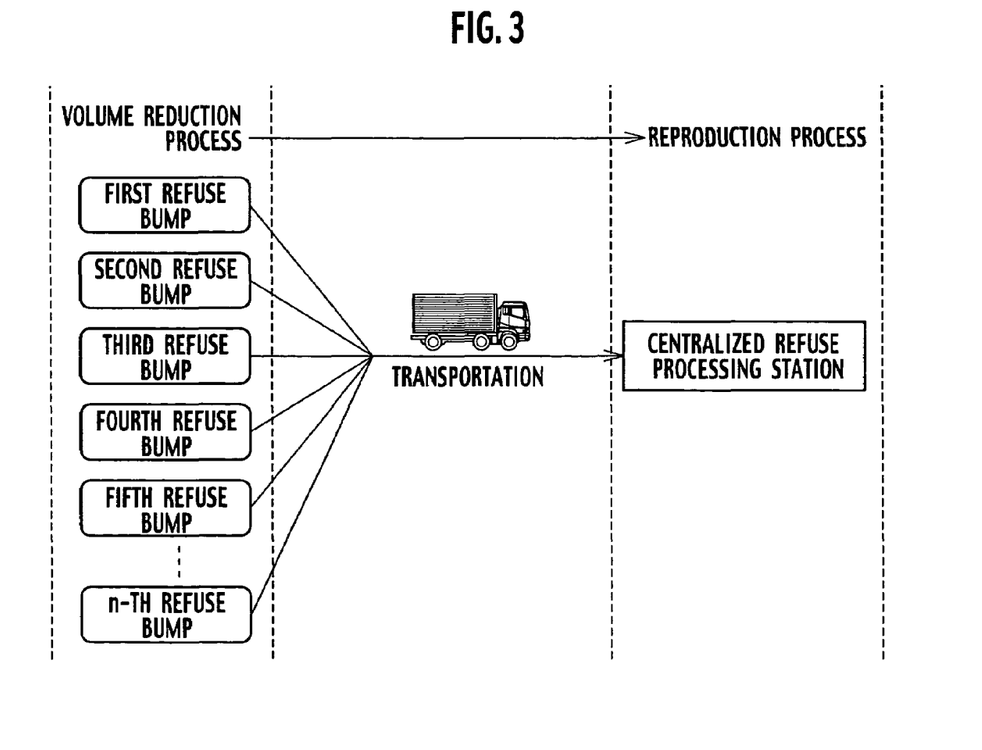
FIG. 3 is a block diagram illustrating a flow of processing the waste product containing flexible polyurethane resin according to the present invention.

The above-described volume reduction process can be independently carried out at each refuse dump of waste products, for example as shown in FIG. 3. A volume reduced product obtained in the volume reduction process is transported by a vehicle from each refuse dump to a centralized refuse processing station, and reproduced therein when the occasion demands. Since the volume reduced pasty product can be maintained in a stale state during carrying-in and carrying-out or transportation without being separated into two phases, i.e., a solid and a liquid, and without any fear of leakage from the container unlike when a liquid is transported, it is possible to reduce the transportation costs and have less handling burdens.

Moreover, the processing device used for the volume reduction process may be installed at each refuse dump, but it may be used in a movable state. That is, the volume reduction processing device is disassembled to a certain extent, put on the vehicle, assembled when stopping over at each refuse dump, and a waste product of the refuse dump is subjected to volume reduction by the assembled volume reduction processing device. After completion of the volume reduction process, the volume reduced product is recovered, the volume reduction processing device is disassembled again to be put on the vehicle, and the product is moved together with the volume reduction processing device. Alternatively, the volume reduction process may be carried out at each refuse dump while the volume reduction processing device is loaded on the transport vehicle. Thus, if the volume reduction processing device is a movable type, it is possible to reduce facility costs since no volume reduction processing device needs to be installed at each refuse dump.

-Decomposing Agent-

In the volume reduction process as described above, the decomposing agent is added to the flexible polyurethane resin contained in waste product. For the decomposing agent, any of the following can be used: (i) a decomposing agent containing an amino group, (ii) a decomposing agent containing a carboxyl group or its derivative, (iii) a decomposing agent containing an epoxy group, (iv) a decomposing agent containing an isocyanate group, etc.

A mixing ratio for the waste product containing flexible polyurethane resin and the decomposing agent can be optionally set. However, desirably, a mixing ratio is set so that a functional group in the decomposing agent is an equivalent weight of 0.1 to 2 with respect to an equivalent weight 1 of an isocyanate group in the flexible polyurethane resin raw material which is a waste product. Additionally, if an isocyanate content in a raw material such as a polyurethane waste material cannot be calculated, usually about 1 to 300 pts. wt. of a decomposing agent may be added with respect to 100 pts. wt. of the polyurethane resin. More preferably, 5 to 100 pts. wt. of a decomposing agent is added. If the amount of the decomposing agent is larger than 300 pts. wt., the decomposing agent may remain in a decomposed product to give adverse effects during resin reproduction. On the other hand, if the amount of the decomposing agent is smaller than 1 pts. wt., sufficient decomposition may not be obtained.

The decomposing agent may be used singularly, or by mixing two kinds or more. Additionally, the decomposing agent may be mixed with polyol, amine, alkanol amine or the like which is normally known as a decomposing agent to be used.

Hereinafter, specific examples of the decomposing agent usable for the volume reduction process of the embodiment will be cited.

(i) Compounds Containing Amino Group

As compounds containing amino groups, there are monoethanol amine, diethanol amine, triehtanol amine, ethylene diamine, tetramethylene diamine, hexamethylene diamine, propane diamine, 2-ethyl hexyl amine, isopropanol amine, 2-(2-aminoethylamino) ethanol, 2-amino-2-hydroxymethyl-1, 3-propane diol, ethylamino ethanol, aminobutanol, n-propyl amine, di-n-propyl amine, n-amyl amine, isobutyl amine, methyl diethyl amine, cyclohexyl amine, piperazine, piperidine, aniline, toluidine, benzyl amine, phenylene diamine, xylylene diamine, chloroaniline, pyridine, picoline, N-methyl morpholine, ethyl morpholine, and pyrazole. Mixed use of these compounds causes no problems.

(ii) Decomposing Agents Containing Carboxyl Group or Acid Anhydride Group

As decomposing agents containing a carboxyl group or an acid anhydride group, there are a formic acid, an acetic acid, a propionic acid, a butyric acid, isobutyric acid, an itaconic acid, propyol acid, an oleic acid, an acrylic acid, a methacrylic acid, an oxalic acid, a maleic acid, a fumaric acid, a phthalic acid, a malonic acid, a succinic acid, an adipic acid, a benzoic acid, a citraconic acid, a crotonic acid, a glutaric acid, a hexanoic acid, a glycolic acid, a lactic acid, a malic acid, a tartaric acid, a citric acid, a saccharic acid, a glyceric acid, a gluconic acid, a salicylic acid, a trimellitic acid, a cyclopentane tetracarbon methylhexahydrophthalic acid, a hexahydrophthalic acid, an organic acid which is an acid anhydride and a lactone subjected to intramolecular dehydration. Even a compound such as trimellitic anhydride which has both a carboxyl group and an acid anhydride is permissible. Further, organic acid salts of these acids represented by sodium salts, potassium salts, calcium salts etc., and esters including these organic acids and hydroxyl groups represented by methyl acetate, ethyl acetate, propyl acetate etc. are mentioned. Additionally, the following amino acids can be used: glycine, alanine, valine, leucine, isoleucine, glutamine, serine, phenylalanine, a glutamic acid etc. Even an amino acid in which a plurality of such are bonded, or an intramolecular bonded imino acid such as proline may be used. Optical isomers of such compounds can similarly be used.

Incidentally, in the decomposition reaction which uses the decomposing agent containing the carboxyl group and its derivative, decomposing agents are suitably selected by taking the following points into consideration in accordance with the kind of polyurethane to be decomposed, decomposition conditions, and the intended purpose of a decomposed product.

In the case where liquid decomposing agents are used at a room temperature, since polyurethane foam is porous material, the liquid reagents may be absorbed by the polyurethane foam in order to deteriorate dispersibility. Thus, in order to increase the dispersibility, decomposing agents which are solid at room temperature (melting point of 40 degrees or more) are desirable, and should desirably be used after being crushed into 1 mm diameter or lower. Examples of such decomposing agents are, phthalic anhydride, succinic anhydride, a salicylic acid, and glycine are available.

In the case where decomposing agents with a low boiling point are used such as phthalic anhydride, succinic anhydride, and a salicylic acid, when the decomposing agent is put together with the polyurethane resin into a high-temperature processing device, the decomposing agent may evaporate earlier than when the decomposition reaction of the urethane compound starts. Thus, if a resin temperature at the exit is set at 200° C. or higher, decomposing agents with boiling points of 150° C. or higher are suitably used.

In the case where decomposing agents which contain two or more functional groups are used, the decomposing agent may react with other substances in the polyurethane decomposed product to become polymers. Thus, a decomposing agent which contains one functional group is desirably used if the amount of used decomposing agent is large (polyurethane 7 pts. wt. or lower with respect to 1 pts. wt. of the decomposing agent), or if heating time is 1 hour or more. However, these conditions do not need to be considered in the case for aromatic acid anhydrides (phthalic anhydride, methyltetrahydrophthalic anhydride, etc.) due to the difficulty of polymerization by steric hindrance. Examples of such decomposing agents, benzoic anhydride, acetic anhydride, phthalic anhydride, butylglycidylether, etc., are available.

Furthermore, in the case where using a decomposing agent which has both a functional group and a hydroxyl group according to the embodiment of the invention, when the decomposing agent reacts with an amino group in a resin decomposed product, substantial conversion occurs from an amino group to a hydroxyl group. Accordingly, if the polyurethane decomposed product is reproduced as a polyurethane resin, a decomposing agent which has a hydroxyl group is desirably used in terms of bond formation. Examples of such decomposing agents are a lactic acid, a salicylic acid, a citric acid, etc.

(iii) Decomposing Agents Containing Epoxy Group

As decomposing agents containing epoxy group to be used for the embodiment, there are ethylene oxide, propylene oxide, butylglycidyl ether, allylglycidyl ether, allyl 2,3-epoxy propyl ether, benzylglycidyl ether, butanediol diglycidyl ether, butyl 2,3-epoxy propyl ether, ethylene glycol diglycidyl ether, phenylglycidyl ether, 1,2-epoxy ethylbenzene, 2,3-epoxy-1-propanol, 2,3-epoxy propylmethy ether, and epoxy compounds in the following generally known as epoxy resins: a bisphenol A type epoxy resin, a bisphenol F type epoxy resin, a phenol novolac type epoxy resin, a cresol novolac type epoxy resin, a naphthol novolak type epoxy resin, a bisphenol A novolak type epoxy resin, a naphthalene diol type epoxy resin, an alicyclic epoxy resin, an epoxy resin derived from tri or tetra (hydroxyphenyl) alkane, a bishydroxy biphenyl type epoxy resin, and a phenolaralkyl resin.

(iv) Decomposing Agents Containing Isocyanate Group

As decomposing agents containing isocyanate group to be used for the embodiment, there are a monoisocyanate compound such as phenyl isocyanate, a compound having a plurality of isocyanate groups such as dipehnyl methane diisocyanate (MDI), tolylene diisocyante (TDI), xylylene diisocyanate, tetramethyl xylylene diisocyanate, 3-isocyanatemethyl-3,5,5-trimethyl cyclohexylisocyanate, 4,4'-methylene bis (cyclohexyl isocyanate), bis (isocyanate methyl) cyclohexane, and hexamethylene diisocyanate, and a polymer compound such as polymeric MDI.

Among the various decomposing agents described above, the decomposing agent having a carboxyl group (—COOH), salts of a carboxyl group, an ester group or an acid anhydride group (—CO—O—CO—) have no amino groups in molecules, but have supplemental functions for amine themselves. Thus, in the case of reheating a volume reduced product to take out polyol, and reproducing the same, concentration of amine which obstructs reproduction can be suppressed.

-Decomposition Catalyst-

In the decomposition reaction of the waste product containing flexible polyurethane resin which uses the decomposing agent, the decomposition reaction rate can be increased by adding a decomposition catalyst to the polyurethane resin and the decomposing agent if necessary.

The added amount of decomposition catalyst is preferably 0.01 pts. wt. or more to 10 pts. wt. or less with respect to 100 pts. wt. of the decomposing agent, more preferably 0.1 pts. wt. or more to 5 pts. wt. or less. If the amount of decomposition catalyst is larger than 10 pts. wt., it is not suitable because reaction control is difficult during reproduction. If the amount is lower than 0.01 pts. wt., sufficient catalyst effects may not be obtained.

As the catalyst to be added, a catalyst used during polyurethane production is desirable. For example, the following are available: triethyl amine, N,N-dimethy cyclohexyl amine, N,N,N',N'-tetramethyl ethylenediamine, N,N,N',N'-tetramethyl propane 1,3-diamine, N,N,N',N'-tetramethyl hexane 1,6-diamine, N,N,N',N'',N''-pentamethyl diethylene triamine, N,N,N',N'',N''-pentamethyl dipropylene triamine, tetramethyl guanidine, triethylene diamine, N,N'-dimethyl piperazine, N-methyl, N'-(2-dimethyl amino) ethyl piperazine, N-methyl morpholine, N-(N',N'-dimethyl aminoethyl)-morpholine, 1,2-dimethyl imidazole, hexamethylene tetramine, dimethyl aminoethanol, dimehyl amino ethoxy ethanol, N,N,N'-trimethyl amino ethyl ethanol amine, N-methyl-N'-(2-hydroxyethyl)-piperazine, N-(2-hydroxyethyl) morpholine, bis (2-dimethyl aminoethyl) ether, ethylene glycol bis (3-dimethyl)-aminopropyl ether, stannous octoate, dibutyltin diacetate, dibutyltin dilaurate, dibutylthin mercaptide, dibutyltin thiocarboxylate, dibutyltin dimaleate, dioctyltin mercaptide, dioctyltin thiocarboxylate, lead octenoate, potassium octenoate, etc.

-Reheating Process-

Products subjected to volume reduction at the refuse dumps are collected to the centralized refuse processing station, and are subjected to reheating therein to be modified into decomposed final products. The reheating is executed in order to progress the decomposition reaction of the polyurethane resin to the final stage so far which has been progressed to a middle stage by the volume reduction process. The decomposed final product obtained through the reheating contains a liquid and a solid. The liquid can be used as a polyurethane raw material to be a polyurethane resin since polyol of a polyurethane raw material is a primary component.

As a device used in the reheating process, one of a continuous type and a batch type can be used as long as they have heating devices. When the continuous type is used, an extruder, a continuous kneader, or the like similar to that used in the volume reduction process can be used. When the batch type is used, a reaction chamber, an oven, or the like having a screw blade and a condenser can be used.

In the reheating process, the decomposition reaction of the polyurethane resin is progressed to the final stage. However, capability of efficiently producing a decomposed final product suited for reproducing the polyurethane resin is desired. For example, a processing temperature is set at 10° C. higher than that in the volume reduction process. In the case of the reheating process which uses the continuous type heating device, a heating temperature is set between 180° C. and 300° C., and retention time is set between 1 and 15 min. In the case where the continuous heating device is used, a reaction temperature T (°C.) and retention time t (min) are desirably adjusted so that a product (T·t) thereof can be 5000 (°C.·min) or higher. In the case the batch type device is used, retention time is set between 10 min. and 3 hours. Additionally, a product of the reaction temperature (°C.) and time (min) is desirably set to 5000 (°C.·min) or higher. For example, in the case that the continuous type device is used, suitable conditions are a retention time of 5 min. or more at 240° C. for the continuous type, and a retention time of 20 min. or more at 250° C., and a retention time of 30 min. or more at 220° C. for the batch type etc. A temperature condition of 180° C. or lower is not practical because there is no sufficient progress in polyurethane decomposition reaction, and it takes too much time. At 300° C. or higher, even a C—C bond in the polyurethane resin may be decomposed to cause excessive reaction.

The volume reduced products of the flexible polyurethane resin contained in wastes product from the refuse dumps are collected into the centralized refuse processing station, and subjected to the reheating process all at once. Accordingly, it is possible to obtain a great volume of decomposed final products efficiently.

-Reproduction Process-

The liquid decomposed product in the decomposed final product obtained in the reheating process is polyol which is a primary component of the polyurethane resin. Thus, the polyurethane resin can be reproduced by using this decomposed liquid product.

In the reproduction process, for example, an isocyanate which is a raw material for the waste flexible polyurethane resin product to be processed or epoxy resin is added as a reproducing agent to the obtained decomposed liquid product, and mixed. The polyurethane resin can be reproduced by putting the obtained mixed liquid into a mold and curing it. When necessary, a polyol compound of the polyurethane resin raw material, a foaming agent, a surfactant, a filler, a catalyst or the like may be added to the compound to be processed.

As described above, an amine concentration in the decomposed product is desirably suppressed in order to control the reproduction reaction well. Accordingly, as decomposing agents used in the volume reduction process, decomposing agents containing a carboxyl group and salts thereof which contain no amine, an ester group and an acid anhydride are preferably used.

However, even in the case where decomposing agents containing amino groups are used, a sufficient reproduction process can be carried out if a treating agent made of a compound having at least one functional group selected from the group consisting of a carboxyl group and salts thereof, an ester group and a haloformyl group (—CO—X, X means halogen) or acid anhydride is added to the decomposed liquid product, the amino group contained in the polyurethane decomposed product is reacted with the treating agent to reduce reactivity caused by the amino group of the polyurethane decomposed product. In this case, it is possible to reproduce the polyurethane resin by adding isocyanate as a reproducing agent which is a raw material of the waste flexible polyurethane resin product to be processed, and curing it.

-Product to be Processed-

A flexible polyurethane resin which is a process waste of a vehicle seat cushion, a thermoplastic resin and a metal were mixed at a predetermined ratio in order to prepare a processed product equivalent to a waste product containing the flexible polyurethane resin. The flexible polyurethane resin contained in this processed product was molded by reacting polyether polyol with an average molecular weight of about 3000, isocyanate (tolylene diisocyanate (TDI)) 20% and diphenyl methane diisocyanate (MDI) 80%. The resin whose flexible polyurethane content was 16 wt % was set as a processed product A, and the resin whose flexible polyurethane content was 90 wt % was set as a processed product B.

-Volume Reduction Process-

In the following examples 1 to 16, the volume reduction process was carried out by using the processed products A and B.

Incidentally, diamine concentration of the volume reduced product obtained in each example was measured by using a gas chromatograph-mass spectrometer (GC/MS).

EXAMPLE 1

Volume reduction of the processed product B was carried out by using the extruder 1 shown in FIG. 2. Diethanol amine was used as the decomposing agent. 10 wt % of the decomposing agent was mixed with the processed product B, and the processed product B and the decomposing agent were kneaded in the cylinder portion 3. The cylinder portion 3 was heated to 210° C., and the rotational speed of the screw 5 was controlled so as to set the retention time of the mixture to 5 min. in the extruder 1. A volume reduced pasty product was discharged from the discharge port 9. The temperature of the volume reduced product, i.e., the resin temperature at exit, was 130° C. Diamine concentration derived from the isocyanate of the polyurethane resin of the obtained volume reduced product was 1.62 wt %.

EXAMPLE 2

Volume reduction of the processed product A was carried out by using the extruder 1 shown in FIG. 2. Methyltetrahydrophthalic anhydride was used as the decomposing agent. 2 wt % of the decomposing agent was mixed with the processed product A, and the product A and the decomposing agent were kneaded in the cylinder portion 3. The cylinder portion 3 was heated to 220° C., and rotation of the screw was controlled so as to set the retention time to 5 min. A volume reduced pasty product was discharged from the discharge port 9 at 212° C. Diamine concentration derived from the isocyanate of the urethane resin ("diamine concentration", hereinafter) of the obtained volume reduced product was 0.14 wt %.

EXAMPLE 3

Volume reduction of the processed product A was carried out by using the extruder 1 shown in FIG. 2. Monoethanol amine was used as the decomposing agent. 10 wt % of the decomposing agent was mixed with the processed product A, and the product A and the decomposing agent were kneaded in the cylinder portion 3. The cylinder portion 3 was heated to 180° C., and rotation of the screw was controlled so as to set the retention time to 5 min. A volume reduced pasty product was discharged from the discharge port 9 at 120° C. Diamine concentration the obtained volume reduced product was 0.24 wt %.

EXAMPLE 4

As in the case of example 2, volume reduction of the processed product A was carried out by using methyltetrahydrophthalic anhydride as the decomposing agent. The volume reduction process was carried out under the same conditions as those in example 2 except for the fact that the mixing ratio of the decomposing agent was 5 wt %, and the rotational speed of the screw was adjusted to set the retention time of the mixture to 2 min. in the cylinder portion 3. An orange-colored volume reduced pasty product was discharged from the discharge port 9 at 196° C. Diamine concentration of the obtained volume reduced product was 0.13 wt %.

EXAMPLES 5 TO 16

In each of the following examples 5 to 16, as in the case of example 4, volume reduction was carried out by using the extruder 1 of FIG. 2 to mix various decomposing agents with the processed product A. Table 1 shows different kinds of decomposing agents, addition ratios, the set temperature in the device (temperature of the cylinder portion), retention time of the processed product, resin temperature at exit, the state of the obtained decomposed product (volume reduced product) and diamine concentration thereof.

TABLE 1

| Example No. | Urethane Waste (processed product) | Decomposing agent | Addition ratio (%) | Set Temperature (° C.) | Temperature at exit (° C.) | Retention time (min) | state of obtained product | Diamin concentration (%) |
|---|---|---|---|---|---|---|---|---|
| 1 | B | Diethanolamine | 10 | 210 | 130 | 5 | Pasty | 1.62 |
| 2 | A | Methyltetra hydrophthalic anhydride | 2 | 220 | 212 | 5 | Pasty | 0.14 |
| 3 | A | Monoethanol Amine | 2 | 180 | 120 | 5 | Pasty | 0.24 |
| 4 | A | Methyltetra hydrophthalic anhydride | 5 | 220 | 196 | 2 | Pasty | 0.13 |
| 5 | A | Phthalic anhydride | 5 | 220 | 210 | 2 | Pasty | 0.11 |
| 6 | A | Phthalic acid | 5 | 220 | 208 | 2 | Pasty | 0.14 |
| 7 | A | Hexahydrophthalic anhydride | 5 | 220 | 215 | 2 | Pasty | 0.13 |
| 8 | A | Succinic anhydride | 5 | 220 | 195 | 2 | Pasty | 0.064 |

TABLE 1-continued

| Example No. | Urethane Waste (processed product) | Decomposing agent | Addition ratio (%) | Set Temperature (° C.) | Temperature at exit (° C.) | Retention time (min) | state of obtained product | Diamin concentration (%) |
|---|---|---|---|---|---|---|---|---|
| 9 | A | Benzoic anhydride | 5 | 220 | 192 | 2 | Pasty | 0.11 |
| 10 | A | Acetic anhydride | 5 | 220 | 198 | 2 | Pasty | 0.14 |
| 11 | A | Adipic acid | 5 | 220 | 192 | 2 | Pasty | 0.08 |
| 12 | A | Salicylic acid | 5 | 220 | 195 | 2 | Pasty | 0.064 |
| 13 | A | Lactic acid | 5 | 220 | 195 | 2 | Pasty | 0.064 |
| 14 | A | glycine | 5 | 220 | 188 | 2 | Pasty | 0.19 |
| 15 | A | MDI | 5 | 220 | 190 | 2 | Pasty | 0.096 |
| 16 | A | Butylglycidyl ether | 5 | 220 | 193 | 2 | Pasty | 0.08 |
| Comparative example 1 | B | Diethanol amine | 10 | 270 | 256 | 25 | Separated in two phases | 4.6 |

COMPARATINE EXAMPLE 1

Volume reduction was carried out under the same conditions as those of example 1 except for the fact that the temperature for the extruder 1 was set at 270° C. A volume reduced product with a resin temperature of 256° C. was discharged in a liquid state from the discharge port 9. When cooled to room temperature, this volume reduced product was separated into a liquid layer and a solid layer. The solid component of the volume reduced product was 63 wt %, and a lot of liquid article was contained. Additionally, diamine concentration of the volume reduced product was 4.6 wt % as a whole.

-Reheating Process-

EXAMPLE 17

The volume reduced product obtained in example 1 was subjected to the reheating process by using the extruder 1 shown in FIG. 2. The volume reduced product was put in through the input port 7 to be heated and kneaded. The temperature of the cylinder portion 3 of the extruder was set to 270° C., and the retention time in the cylinder portion 3 was set to 5 min. An orange-colored decomposed liquid product of 252° C. was discharged from the discharge port 9. When left at room temperature overnight, this decomposed product separated into two phases: an upper layer which was the orange-colored liquid product, and a lower layer which was the brown-colored solid product. The liquid component of the decomposed product which was 53 wt %. Additionally, diamine concentration of this decomposed product was 5.2 wt % as a whole.

EXAMPLE 18

The volume reduced product of example 2 was put into a pail can, and placed in an oven at 250° C. The cap was not closed tightly for safety concerns. After 1 hour and 30 min., the volume reduced product separated into two phases as in the case of example 17. The liquid component of the decomposed product was 45 wt %. Additionally, diamine concentration of the decomposed product was 0.30 wt % as a whole.

EXAMPLE 19

The volume reduction process was carried out by using a mobile extruder at an automobile waste shredder operator. Shredder residues which were waste products containing flexible polyurethane resin were used as products to be processed. The flexible polyurethane resin with about 16 wt % was contained in the shredder residues. The volume reduction was executed by using the extruder under the same conditions as those of example 2. The volume reduced pasty product was discharged from the discharge port at 212° C. The obtained volume reduced product was stored in a pail can.

Volume reduction of the products to be processed were carried out under the same conditions at five shredder operators, and the obtained volume reduced products were transported by truck to the centralized refuse processing station to be collected.

At the centralized refuse processing station, the volume reduced products collected in the pail cans were placed in an oven at 250° C. and subjected to a reheating process. The cap was not closed tightly for safety concerns. After 1 hour and 30 min., the volume reduced products became a decomposed product separated into two phases. The liquid component of this decomposed product was 43%.

COMPARATIVE EXAMPLE 2

The volume reduced product of example 2 was collected at the centralized refuse processing station. The volume reduced product in pail can was placed in an oven at 250° C., and the cap was not set closed tightly for safety concerns. After 10 min., the solid component of the volume reduced product was 92 wt %, and the decomposition progress was not sufficient. The diamine concentration of this decomposed product was 0.16 wt % as a whole.

-Reproduction Process-

REFERENCE EXAMPLE

The liquid decomposed product 10 g of the decomposed product obtained in the reheating process of example 17, and polyol for a flexible polyurethane (mixed with a catalyst, a foaming agent, a surfactant or the like) 90 g were mixed. Further, isocyanate 37 g used for the flexible polyurethane resin raw material to be processed was added and mixed at a high speed. When the obtained mixed liquid was put into a mold and left at room temperature for a day, a foamed and cured resin composition was obtained. The density of this resin composition was 200 kg/m³, and polyurethane foam with foaming magnification of about 5 times was prepared.

As described above, according to the processing method according to the embodiment of the present invention, since the decomposed pasty product without having separated into liquid and solid layers can be obtained as a volume reduced product of the waste product containing flexible polyurethane resin, handling and transportation are easy. Thus, it is possible to reduce transportation costs.

Moreover, according to the second feature of the processing method of the present invention, a decomposed final product can be obtained by further heating the decomposed pasty product. This decomposed final product can be reproduced as a polyurethane resin to facilitate effective use of resources.

Various modifications will become possible for those skilled in the art after receiving the teachings of the present disclosure without departing from the scope thereof.

What is claimed is:

1. A method of treating waste product containing flexible polyurethane resin comprising:
    adding about 1 to 300 parts per weight of a decomposing agent to about 100 parts per weight of the waste product containing flexible polyurethane resin to start a decomposition reaction, the decomposing agent being at least one agent selected from the group consisting of an amino group, a carboxyl group, a derivative of the carboxyl group, an epoxy group, an isocyanate group, and an acid anhydride group; and
    terminating the decomposition reaction at a stage in which a diamine concentration derived from an isocyanate raw material of the flexible polyurethane resin is from about 0.06 wt % to 2 wt % to obtain a pasty intermediate product.

2. The method of claim 1, further comprising:
    heating the intermediate product to obtain a decomposed final product.

3. The method of claim 1, wherein the decomposition reaction is carried out by kneading the mixture including the waste product and the decomposing agent in a temperature of between 150° C. to 250° C. and the decomposition reaction is terminated at between 20 seconds to 15 minutes after the decomposition reaction has started.

4. The method of claim 3, wherein the decomposition reaction is carried out in an extruder performing heating and kneading simultaneously.

5. The method of claim 4, wherein a retention time of a decomposed product obtained by the decomposition reaction in the extruder is within 15 minutes and a decomposed product temperature at a discharge port of the extruder is within a range of 80° C. to 250° C.

6. The method of claim 1, wherein the waste product is obtained from cushion material of a vehicle seat.

7. A method of treating waste product containing flexible polyurethane resin comprising:
    adding a decomposing agent to the waste product containing flexible polyurethane resin to start a decomposition reaction, the decomposing agent being at least one agent selected from the group consisting of an amino group, a carboxyl group, a derivative of the carboxyl group, an epoxy group, an isocyanate group, and an acid anhydride group; and
    terminating the decomposition reaction within a diamine concentration range of 1/300000 to 1/2 of a diamine concentration derived from an isocyanate raw material of the flexible polyurethane resin contained in a decomposed final product obtained when the decomposition reaction progresses to a final stage to obtain a pasty intermediate product.

8. The method of claim 7, further comprising:
    heating the intermediate product to obtain a decomposed final product.

9. The method of claim 7, wherein the decomposition reaction is carried out by kneading the mixture including the waste product and the decomposing agent in a temperature of between 150° C. to 250° C. and the decomposition reaction is terminated at between 20 seconds to 15 minutes after the decomposition reaction has started.

10. The method of claim 9, wherein the decomposition reaction is carried out in an extruder performing heating and kneading simultaneously.

11. The method of claim 10, wherein a retention time of a decomposed product obtained by the decomposition reaction in the extruder is within 15 minutes and the temperature of the decomposed product at a discharge port of the extruder is within a range of 80° C. to 250° C.

12. The method of claim 7, wherein the waste product is obtained from cushion material of a vehicle seat.

13. A method of treating waste product containing flexible polyurethane resin comprising:
    reheating a pasty intermediate product obtained by terminating the decomposition reaction of the waste product to obtain a decomposed final product, wherein the decomposition reaction is terminated at a stage in which a diamine concentration derived from an isocyanate raw material of the flexible polyurethane resin is from about 0.06 wt % to 2 wt %.

14. The method of claim 13, wherein the reheating includes kneading with a temperature 10° C. higher than the decomposition reaction temperature and less than 300° C.

15. The method of claim 14, wherein the reheating is carries out in an extruder performing heating and kneading simultaneously.

16. The method of claim 15, wherein the reheating is carried out under conditions with a set temperature in the extruder of between 180° C. and 300° C. and a retention time of a decomposed product in the extruder is between 1 and 15 minutes, and a product of the set temperature and the retention time is 5000° C.×min or higher.

17. The method of claim 14, wherein the reheating process is used in a batch system in a set temperature in the batch system is between 180° C. and 300° C. and retention time is between 10 minutes and 3 hours, and a product of the set temperature and the time is 5000° C.×min or higher.

18. The method of claim 13, wherein the waste product is obtained from cushion material of a vehicle seat.

19. An intermediate product treated by a process comprising:
    adding a decomposing agent to the waste product containing flexible polyurethane resin to start a decomposition reaction, the decomposing agent being at least one agent selected from the group consisting of an amino group, a carboxyl group, a derivative of the carboxyl group, an epoxy group, an isocyanate group, and an acid anhydride group; and
    terminating the decomposition reaction at a stage in which a diamine concentration derived from an isocyanate raw material of the flexible polyurethane resin is from about 0.06 wt % to 2 wt % to obtain a pasty intermediate product.

20. A decomposed final product treated by a process comprising:
  reheating a pasty intermediate product obtained by terminating a decomposition reaction of the waste product containing flexible polyurethane resin, wherein the decomposition reaction is terminated at a stage in which a diamine concentration derived from an isocyanate raw material of the flexible polyurethane resin is from about 0.06 wt % to 2 wt %.

21. The method of claim 1, comprising:
  adding about 2 to 10 parts per weight of the decomposing agent.

* * * * *

UNITED STATES PATENT AND TRADEMARK OFFICE
CERTIFICATE OF CORRECTION

PATENT NO.        : 7,141,647 B2                                  Page 1 of 1
APPLICATION NO.   : 10/873237
DATED             : November 28, 2006
INVENTOR(S)       : Shioko Saya et al.

It is certified that error appears in the above-identified patent and that said Letters Patent is hereby corrected as shown below:

On the title page Item (54) should read:

--METHOD OF TREATING WASTE PRODUCT CONTAINING FLEXIBLE POLYURETHANE RESIN--; and Item (75) should read:

--(75) Inventors: Shioko Saya, Yokohama (JP); Taro Fukaya, Yokohama (JP); Cao Minh Thai, Yokohama (JP); Shinetsu Fujieda, Kawasaki (JP)

Signed and Sealed this

Thirteenth Day of February, 2007

JON W. DUDAS
*Director of the United States Patent and Trademark Office*